United States Patent
Berlin

(10) Patent No.: US 9,239,812 B1
(45) Date of Patent: Jan. 19, 2016

(54) SYSTEM FOR AND METHOD OF PROVIDING A UNIVERSAL I/O COMMAND TRANSLATION FRAMEWORK IN AN APPLICATION PUBLISHING ENVIRONMENT

(75) Inventor: Christoph Berlin, Campbell, CA (US)

(73) Assignee: HOPTO INC., Campbell, CA (US)

( * ) Notice: Subject to any disclaimer, the term of this patent is extended or adjusted under 35 U.S.C. 154(b) by 0 days.

(21) Appl. No.: 13/570,106

(22) Filed: Aug. 8, 2012

(51) Int. Cl.
*G06F 15/16* (2006.01)

(52) U.S. Cl.
CPC ........................... *G06F 15/16* (2013.01)

(58) Field of Classification Search
CPC ........................................................ G06F 15/16
USPC ........................................................ 709/203
See application file for complete search history.

(56) References Cited

U.S. PATENT DOCUMENTS

| | | | |
|---|---|---|---|
| 5,831,609 A | 11/1998 | London et al. | |
| 5,898,419 A | 4/1999 | Liu | |
| 5,978,834 A | 11/1999 | Simonoff et al. | |
| 6,288,702 B1 | 9/2001 | Tachibana | |
| 7,051,288 B2 | 5/2006 | Bennet et al. | |
| 7,188,181 B1 | 3/2007 | Squier et al. | |
| 7,222,158 B2 | 5/2007 | Wexelblat | |
| 7,249,175 B1 | 7/2007 | Donaldson | |
| 7,353,252 B1 | 4/2008 | Yang et al. | |
| 7,461,134 B2 | 12/2008 | Ambrose | |
| 7,526,792 B2 | 4/2009 | Ross | |
| 7,587,459 B2 | 9/2009 | Wewalaarachchi et al. | |
| 7,647,411 B1 | 1/2010 | Schiavone et al. | |
| 7,716,302 B2 | 5/2010 | Maze et al. | |
| 7,739,693 B2 | 6/2010 | Bernhard et al. | |
| 7,920,528 B2 | 4/2011 | Karaoguz et al. | |
| 8,073,855 B2 | 12/2011 | Nagoya | |
| 8,219,807 B1 | 7/2012 | Danoyan et al. | |
| 8,281,410 B1 * | 10/2012 | Sobel et al. | 726/27 |
| 8,427,445 B2 | 4/2013 | Kennedy | |

(Continued)

FOREIGN PATENT DOCUMENTS

WO    WO 2010/135127    11/2010

OTHER PUBLICATIONS

U.S. Appl. No. 13/481,746 Office Action mailed Dec. 19, 2013.

(Continued)

*Primary Examiner* — June Sison
*Assistant Examiner* — Steven Nguyen
(74) *Attorney, Agent, or Firm* — Lewis Roca Rothgerber LLP

(57) ABSTRACT

A system and method of providing a universal input/output (I/O) command translation framework in an application publishing environment is disclosed. A client-server computing system includes a network of one or more host computers and an application server that further includes an application publishing service supporting multiple client devices and a translation framework that provides a set of generic public APIs. Using the translation framework, an application-specific translation layer is created and integrated into remote applications, which enables I/O commands from client devices to be interpreted by remote applications whose control functions only exist internally (i.e., controls are private). The application-specific translation layer also receives the I/O commands of the client devices that may be generated via touch-based user input. Then, the application-specific translation layer translates the client I/O commands to the native internal control functions of the remote application.

11 Claims, 6 Drawing Sheets

(56) References Cited

U.S. PATENT DOCUMENTS

| | | | |
|---|---|---|---|
| 8,438,473 B2 | 5/2013 | Mak et al. |
| 8,527,978 B1 | 9/2013 | Sallam |
| 8,688,734 B1 | 4/2014 | Tidd |
| 8,694,507 B2 | 4/2014 | Meyerzon et al. |
| 8,713,658 B1 | 4/2014 | Tidd |
| 8,738,814 B1* | 5/2014 | Cronin ........................ 710/5 |
| 8,799,777 B1 | 8/2014 | Lee |
| 8,856,907 B1 | 10/2014 | Tidd |
| 8,863,232 B1 | 10/2014 | Tidd |
| 8,887,132 B1 | 11/2014 | Hunter |
| 8,950,007 B1 | 2/2015 | Teal et al. |
| 8,954,887 B1 | 2/2015 | Tseng |
| 9,165,160 B1 | 10/2015 | Tidd |
| 2001/0023438 A1 | 9/2001 | Ishida |
| 2002/0091697 A1 | 7/2002 | Huang et al. |
| 2002/0158921 A1 | 10/2002 | Silverstein |
| 2003/0163448 A1 | 8/2003 | Kilemba et al. |
| 2004/0080771 A1 | 4/2004 | Mihira et al. |
| 2004/0190049 A1 | 9/2004 | Itoh |
| 2005/0044483 A1 | 2/2005 | Maze et al. |
| 2005/0093868 A1 | 5/2005 | Hinckley |
| 2005/0114760 A1 | 5/2005 | Arregui et al. |
| 2005/0149857 A1 | 7/2005 | Negishi et al. |
| 2005/0177730 A1 | 8/2005 | Davenport et al. |
| 2005/0198299 A1 | 9/2005 | Beck et al. |
| 2005/0210418 A1 | 9/2005 | Marvit et al. |
| 2006/0047780 A1 | 3/2006 | Patnude |
| 2006/0075224 A1 | 4/2006 | Tao |
| 2006/0150256 A1 | 7/2006 | Fanton et al. |
| 2006/0161846 A1 | 7/2006 | Van Leeuwen |
| 2006/0253558 A1* | 11/2006 | Acree et al. ........................ 709/220 |
| 2007/0061264 A1 | 3/2007 | Yeung et al. |
| 2007/0078994 A1 | 4/2007 | Wilson et al. |
| 2007/0113187 A1 | 5/2007 | McMullen et al. |
| 2007/0121584 A1 | 5/2007 | Qiu et al. |
| 2007/0198950 A1 | 8/2007 | Dodge |
| 2007/0280459 A1 | 12/2007 | Yee et al. |
| 2007/0283446 A1 | 12/2007 | Yami et al. |
| 2008/0016504 A1 | 1/2008 | Cheng et al. |
| 2008/0071860 A1* | 3/2008 | Dal Canto et al. ............ 709/203 |
| 2008/0137131 A1 | 6/2008 | Cavill et al. |
| 2008/0167005 A1 | 7/2008 | Gilzean et al. |
| 2008/0209537 A1 | 8/2008 | Wong et al. |
| 2008/0270516 A1 | 10/2008 | Ragnet et al. |
| 2009/0013045 A1 | 1/2009 | Maes et al. |
| 2009/0013273 A1 | 1/2009 | Fuchs |
| 2009/0021387 A1 | 1/2009 | Hosono |
| 2009/0024626 A1 | 1/2009 | Takei |
| 2009/0027334 A1 | 1/2009 | Foulk et al. |
| 2009/0037976 A1 | 2/2009 | Teo et al. |
| 2009/0070404 A1 | 3/2009 | Mazzaferri |
| 2009/0083852 A1 | 3/2009 | Kuo et al. |
| 2009/0132509 A1 | 5/2009 | Nagoya |
| 2009/0177791 A1 | 7/2009 | Edelstein et al. |
| 2009/0180777 A1 | 7/2009 | Bernard et al. |
| 2009/0182501 A1 | 7/2009 | Fyke |
| 2009/0187857 A1 | 7/2009 | Tanaka |
| 2009/0204711 A1 | 8/2009 | Binyamin |
| 2009/0231285 A1 | 9/2009 | Duncan |
| 2009/0235347 A1 | 9/2009 | Syed et al. |
| 2009/0245176 A1 | 10/2009 | Balasubramanian et al. |
| 2009/0300129 A1 | 12/2009 | Golub |
| 2010/0020025 A1 | 1/2010 | Lemort et al. |
| 2010/0058431 A1 | 3/2010 | McCorkendale et al. |
| 2010/0138780 A1 | 6/2010 | Marano et al. |
| 2010/0153581 A1 | 6/2010 | Nagarajan et al. |
| 2010/0162163 A1 | 6/2010 | Wang et al. |
| 2010/0228963 A1 | 9/2010 | Kassab et al. |
| 2010/0269152 A1 | 10/2010 | Pahlavan et al. |
| 2010/0293499 A1 | 11/2010 | Young et al. |
| 2010/0295817 A1 | 11/2010 | Nicholson et al. |
| 2010/0321406 A1 | 12/2010 | Iwase |
| 2010/0325716 A1 | 12/2010 | Hong et al. |
| 2011/0010668 A1 | 1/2011 | Feldstein |
| 2011/0029772 A1 | 2/2011 | Fanton et al. |
| 2011/0113427 A1 | 5/2011 | Dotan |
| 2011/0137974 A1 | 6/2011 | Momchilov |
| 2011/0138295 A1 | 6/2011 | Momchilov et al. |
| 2011/0138314 A1 | 6/2011 | Mir et al. |
| 2011/0141031 A1 | 6/2011 | McCullough et al. |
| 2011/0154212 A1 | 6/2011 | Gharpure et al. |
| 2011/0191407 A1 | 8/2011 | Fu et al. |
| 2011/0197051 A1 | 8/2011 | Mullin et al. |
| 2011/0209064 A1 | 8/2011 | Jorgensen et al. |
| 2011/0258271 A1 | 10/2011 | Gaquin |
| 2011/0264463 A1 | 10/2011 | Kincaid |
| 2011/0270936 A1 | 11/2011 | Guthrie et al. |
| 2011/0277027 A1 | 11/2011 | Hayton et al. |
| 2011/0279829 A1 | 11/2011 | Chang et al. |
| 2011/0302495 A1 | 12/2011 | Pinto et al. |
| 2011/0307614 A1 | 12/2011 | Bernardi et al. |
| 2011/0314093 A1 | 12/2011 | Sheu et al. |
| 2012/0011472 A1 | 1/2012 | Ohkubo |
| 2012/0011578 A1 | 1/2012 | Hinton et al. |
| 2012/0023593 A1 | 1/2012 | Puder et al. |
| 2012/0054671 A1 | 3/2012 | Thompson et al. |
| 2012/0066695 A1* | 3/2012 | Berezansky et al. ........... 719/328 |
| 2012/0066762 A1 | 3/2012 | Todorovic |
| 2012/0084713 A1 | 4/2012 | Desai et al. |
| 2012/0092277 A1 | 4/2012 | Momchilov |
| 2012/0096389 A1 | 4/2012 | Flam et al. |
| 2012/0159570 A1 | 6/2012 | Reierson et al. |
| 2012/0173673 A1 | 7/2012 | Dietrich et al. |
| 2012/0185527 A1 | 7/2012 | Jaudon et al. |
| 2012/0185767 A1 | 7/2012 | Schlegel |
| 2012/0226742 A1 | 9/2012 | Momchilov et al. |
| 2012/0246645 A1 | 9/2012 | Iikura et al. |
| 2012/0297471 A1 | 11/2012 | Smithson |
| 2012/0304061 A1 | 11/2012 | Hoover |
| 2012/0304168 A1 | 11/2012 | Raj Seeniraj et al. |
| 2012/0311070 A1* | 12/2012 | BianRosa et al. .............. 709/217 |
| 2012/0324365 A1 | 12/2012 | Momchilov et al. |
| 2013/0060842 A1 | 3/2013 | Grossman |
| 2013/0097550 A1 | 4/2013 | Grossman et al. |
| 2013/0110828 A1 | 5/2013 | Meyerzon et al. |
| 2013/0198600 A1 | 8/2013 | Lockhart et al. |
| 2013/0219338 A1 | 8/2013 | VanBlon |
| 2013/0254675 A1 | 9/2013 | de Andrade et al. |
| 2013/0254761 A1 | 9/2013 | Reddy et al. |
| 2013/0290856 A1 | 10/2013 | Beveridge et al. |
| 2013/0305344 A1 | 11/2013 | Alicherry et al. |
| 2013/0318582 A1 | 11/2013 | McCann et al. |
| 2013/0326583 A1 | 12/2013 | Freihold et al. |
| 2014/0012574 A1 | 1/2014 | Pasupalak et al. |
| 2014/0026057 A1 | 1/2014 | Kimpton et al. |
| 2014/0074881 A1 | 3/2014 | Meyerzon et al. |
| 2014/0143846 A1 | 5/2014 | Tidd |
| 2014/0143847 A1 | 5/2014 | Tidd |
| 2015/0074199 A1 | 3/2015 | Lv |

OTHER PUBLICATIONS

U.S. Appl. No. 13/481,751 Office Action dated Dec. 30, 2013.
U.S. Appl. No. 13/367,239 Final Office Action dated Nov. 14, 2013.
U.S. Appl. No. 13/481,742 Final Office Action dated Sep. 4, 2013.
U.S. Appl. No. 13/481,752 Final Office Action dated Sep. 4, 2013.
U.S. Appl. No. 13/753,474 Office Action dated Nov. 21, 2013.
U.S. Appl. No. 13/367,228 Final Office Action dated Jul. 23, 2013.
U.S. Appl. No. 13/367,228 Office Action dated Jan. 30, 2013.
U.S. Appl. No. 13/367,239 Office Action dated Jun. 24, 2013.
U.S. Appl. No. 13/481,742 Office Action dated May 9, 2013.
U.S. Appl. No. 13/481,752 Office Action dated May 9, 2013.
Park et al.; "Role-based access control on the web"; ACM transactions on information and system security; vol. 4, No. 1, Feb. 2001. p. 37-71, 35 pages.
U.S. Appl. No. 13/753,474 Office Action mailed Jun. 11, 2014.
U.S. Appl. No. 13/570,115 Final Office Action mailed Jun. 30, 2014.
U.S. Appl. No. 13/481,746 Final Office Action mailed Mar. 26, 2014.
U.S. Appl. No. 13/570,108 Office Action mailed May 13, 2014.
U.S. Appl. No. 13/753,474 Final Office Action mailed Mar. 6, 2014.
U.S. Appl. No. 13/570,115 Office Action mailed Feb. 11, 2014.
U.S. Appl. No. 13/481,751 Final Office Action mailed Sep. 3, 2014.

(56) References Cited

OTHER PUBLICATIONS

U.S. Appl. No. 13/753,474 Final Office Action mailed Oct. 6, 2014.
U.S. Appl. No. 13/570,108 Office Action mailed Oct. 10, 2014.
U.S. Appl. No. 13/668,097 Office Action mailed Sep. 12, 2014.
U.S. Appl. No. 13/668,100 Office Action mailed Sep. 10, 2014.
U.S. Appl. No. 13/753,475 Office Action mailed Apr. 24, 2015.
U.S. Appl. No. 13/753,476 Office Action mailed Apr. 22, 2015.
U.S. Appl. No. 13/570,115 Office Action mailed Jun. 19, 2015.
U.S. Appl. No. 13/570,103 Office Action mailed Apr. 24, 2015.
U.S. Appl. No. 13/668,097 Final Office Action mailed Jun. 16, 2015.
U.S. Appl. No. 13/668,100 Final Office Action mailed Jun. 17, 2015.
U.S. Appl. No. 13/481,743 Office Action mailed Jan. 14, 2015.
U.S. Appl. No. 14/332,660 Office Action mailed Mar. 27, 2015.
U.S. Appl. No. 13/481,745 Office Action mailed Feb. 10, 2015.
U.S. Appl. No. 13/753,474 Office Action mailed Mar. 27, 2015.
U.S. Appl. No. 13/570,108 Office Action mailed Apr. 1, 2015.
U.S. Appl. No. 13/570,110 Office Action mailed Mar. 30, 2015.
U.S. Appl. No. 13/570,111 Office Action mailed Apr. 1, 2015.
U.S. Appl. No. 13/570,113 Office Action mailed Apr. 3, 2015.
U.S. Appl. No. 13/753,477 Office Action mailed Jul. 29, 2015.
U.S. Appl. No. 13/753,478 Office Action mailed Aug. 19, 2015.
U.S. Appl. No. 13/753,479 Office Action mailed Aug. 12, 2015.
U.S. Appl. No. 13/668,105 Office Action mailed Jul. 8, 2015.
U.S. Appl. No. 13/481,746 Office Action mailed Sep. 15, 2015.
U.S. Appl. No. 13/481,751 Office Action mailed Sep. 15, 2015.
U.S. Appl. No. 14/332,660 Final Office Action mailed Nov. 3, 2015.
U.S. Appl. No. 13/481,743 Office Action mailed Oct. 23, 2015.
U.S. Appl. No. 13/570,108 Final Office Action mailed Oct. 29, 2015.

* cited by examiner

SYSTEM FOR AND METHOD OF PROVIDING A UNIVERSAL I/O COMMAND TRANSLATION FRAMEWORK IN AN APPLICATION PUBLISHING ENVIRONMENT

TECHNICAL FIELD

Various inventive embodiments disclosed herein relate generally to processing computer input/output operations, and more particularly to a system for and method of providing a universal input/output (I/O) command translation framework in an application publishing environment.

BACKGROUND

Many different types of computing devices exist today. Many computing devices use traditional input/output (I/O) devices (e.g., mouse, keyboard, and display). However, there are many computing devices that do not use traditional I/O devices. For example, more and more handheld computing devices, such as mobile phones (e.g., Android™ Phone and iPhone), personal digital assistants (PDAs) (e.g., Blackberry®), and tablet devices (e.g., iPad and Samsung Galaxy Tab), are relying on touchscreen technology as the primary mechanism by which users interact with the device. In a remote access system in which a user uses a remote device, such as the aforementioned handheld computing devices, to access resources of an application host computer or application server, there may be certain limitations due to incompatibility of I/O devices between the user's remote access device and the application host computer or application server. For example, the control functions of the applications that are being accessed remotely from the application host computer or application server may not be exposed (i.e., published) to the client devices and therefore there can be no direct access to the functionality of these applications using the client devices. In other words, the control functions exist internal to these applications and without direct accessibility by other programs or processes.

BRIEF DESCRIPTION OF THE DRAWINGS

Various inventive embodiments disclosed herein, both as to its organization and manner of operation, together with further objectives and advantages, may be best understood by reference to the following description, taken in connection with the accompanying drawings as set forth below.

DETAILED DESCRIPTION

The disclosure provides a system for and method of providing a universal input/output (I/O) command translation framework in an application publishing environment. The client-server computing system of the disclosure exhibits numerous advantages over existing systems. In various embodiments, the client computing system provides a universal translation framework that is integrated into the remote applications of the host computer, application server, or cloud server. Using the translation framework, an application-specific translation layer can be created and integrated into remote applications. The application-specific translation layer enables I/O commands from client devices to be interpreted by remote applications whose control functions only exist internally (i.e., controls are private, not published). The application-specific translation layer that is created using the translation framework receives the I/O commands of the client device that are generated via touch-based user input. Then, the application-specific translation layer translates the client I/O commands to the native internal control functions of the remote application. The remote application then performs actions according to the translated I/O commands. Next, the actions that result from a translated I/O commands are "remoted" from the host computer, application server, or cloud server to the client device and the display of the client device is updated accordingly.

Therefore, in various embodiments, the client-server computing system of the disclosure and associated methods enable the user to access applications that are designed for mouse and keyboard input using their touch-based client devices, thereby enabling cross-platform application execution.

Figure 1:
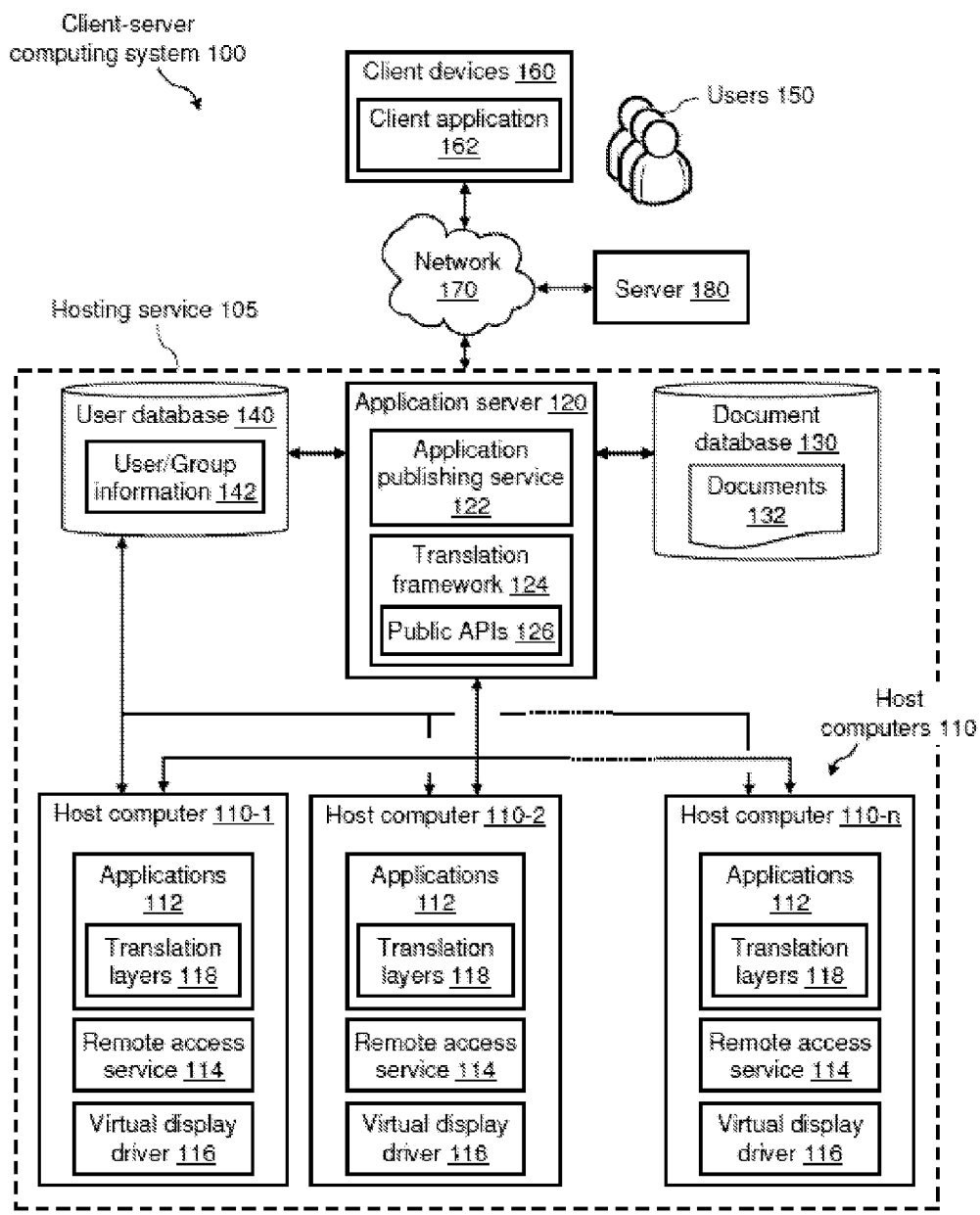
FIG. 1 illustrates a block diagram of a client-server computing system for providing a universal I/O command translation framework in an application server environment.

FIG. 1 illustrates a block diagram of a client-server computing system 100 for providing a universal I/O command translation framework in an application publishing environment. Client-server computing system 100 includes a hosting service 105, which is a cluster of computing resources that support application publishing for users who are accessing hosting service 105 remotely.

In one example, hosting service 105 includes a network of one or more host computers 110, i.e., host computers 110-1 through 110-n; an application server 120; a document database 130; and a user database 140. Host computers 110-1 through 110-n may be connected to application server 120 and user database 140 via, for example, a TCP connection. The TCP connection may be a standard TCP connection with no encryption or a TCP connection with encryption.

One or more users 150 are associated with client-server computing system 100. Users 150 may be individual users and/or groups of users and, thus, hereafter it may be understood that any reference to users 150 means individual users or user groups (i.e., groups of users 150). Users 150 may access hosting service 105 via client devices 160, which are connected to hosting service 105 via a network 170.

Network 170 may be, for example, a local area network (LAN) and/or a wide area network (WAN) for connecting to the Internet. Entities of client-server computing system 100 may connect to network 170 by any wired and/or wireless means. Client-server computing system 100 may be implemented using standard client-server architecture between hosting service 105 and client devices 160.

Host computers 110 are any computers on which any types of resources, applications, programs, processes, files, and/or data may be installed and accessed by client devices 160 through hosting service 105. Accordingly, the operating systems of host computers 110 may be, for example, the Windows operating system, the Linux operating system, the UNIX operating system, the Mac OS X operating system, and the like.

It is to be understood that the application publishing server 120 and host computer 110-1 etc., may comprise the same physical machine.

Client devices 160 are, for example, desktop computers, laptop computers, handheld computing devices, mobile phones, and tablet devices. In the example of mobile devices, the operating systems of client devices 160 may be, for example, the iOS operating system (Apple Inc., Cupertino, Calif.), the Android operating system (Google Inc., Mountain View, Calif.), the Windows CE and the Windows Mobile operating systems (Microsoft Corp., Redmond, Wash.), and the like.

In a remote access system, such as client-server computing system 100, the "remoting" software is installed and executing (i.e., "running") on each host computer 110, which is software that allows users 150 to remotely access applications that are installed on each host computer 110. By way of example, a set of applications 112 are installed on each host computer 110. Applications 112 represent any applications, programs, and/or processes executing (i.e., "running") on host computers 110. The functionality of applications 112 shall be visible to and accessible by client devices 160 via network 170. For example, the functionality of applications 112 may be accessed from client devices 160 using a process herein known as application publishing, which is currently supported by products such as GraphOn GO-Global, Microsoft Remote Desktop Services and Citrix XenApp. Such application publishing may be performed in accordance with teachings of commonly-owned U.S. Pat. No. 5,831,609, filed Jun. 6, 1995, entitled "Method and system for dynamic translation between different graphical user interface systems", which is incorporated by reference as though fully set forth herein.

Examples of applications 112 include, but are not limited to, the Microsoft® Office suite of programs (e.g., Word, PowerPoint, Excel, Outlook, Access, and Publisher); Microsoft® Visio; a personal or business finance application, such as Intuit® QuickBooks® and Intuit® Quicken® (Intuit Inc., Mountain View, Calif.); a computer-aided design (CAD) application, such as Autodesk® AutoCAD® (Autodesk, Inc., San Rafael, Calif., USA) and Cadence® Virtuoso® (Cadence Design Systems, San Jose, Calif.); a medical clinical workflow application, such as Siemens AG Symbia.net™ (Siemens AG, Munich, Germany); an interactive mapping application, such as Google Earth (Google, Inc.); a web browser application, such as Internet Explorer, Safari, and Mozilla Firefox; Adobe® Reader (Adobe Systems Incorporated, San Jose, Calif.); a 3D game; and the like.

Using an example of three host computers 110-1, 110-2, and 110-3, instances of the same or different types of applications 112 may be installed on each of the host computers 110-1, 110-2, and 110-3. For example, the Microsoft® Office suite of programs may be installed and available on all three host computers 110-1, 110-2, and 110-3. Adobe® Reader may be installed and available on host computers 110-2 and 110-3, but not on host computer 110-1. Autodesk® AutoCAD® and the AutoCAD® viewer may be installed and available only on host computer 110-2. Intuit® Quick-Books® may be installed and available on host computers 110-1 and 110-3, but not on host computer 110-2, and so on.

Each host computer 110 further includes a remote access service 114 and a virtual display driver 116. Remote access service 114 provides an application publishing service. Namely, at each host computer 110, remote access service 114 is used to publish its applications 112 to users 150. The remote access service 114 is an application running on each host computer 110 that is capable of starting a remote session in which applications can be run and displayed to a user 150 at his/her client device 160, which is a remote device. The remote access service 114 application manages the communication of each host computer 110 with the client device 160 with respect to creating and displaying host sessions on behalf of users 150. Namely, remote access service 114 is the application or process that manages the user access process at the host computer 110 whenever an application access request is received from a client device 160 of a certain user 150 via application server 120.

Virtual display driver 116 is a software code module that enables commands or functions that are called in host computer 110 to be encoded and transmitted to client devices 160 over network 170. Namely, virtual display driver 116 is used to communicate display commands from each host computer 110 to client devices 160. More particularly, when "remoting" the user interface of the applications 112 to client devices 160, display commands of the host computer 110 are directed to virtual display driver 116 for communication to client devices 160 via network 170.

Application server 120 is used as the gateway into hosting service 105. Namely, application server 120 provides the interface between client devices 160 and host computers 110. As such, applications 112 of host computers 110-1 through 110-n is delivered to client devices 160 via application server 120. More specifically, application server 120 includes a application publishing service 122. Application publishing service 122 may be implemented as a web application that is accessible by client devices 160 via, for example, the Internet (e.g., network 170). Application publishing service 122 controls access to host computers 110 and any other entities of hosting service 105. More particularly, under the control of application publishing service 122, applications 112 of host computers 110 shall be visible to and accessible by client devices 160 via network 170. For example, users 150 authenticate to application server 120 using application publishing service 122. Once authenticated, based on access rights and permissions, users 150 are allowed access to applications 112 of host computers 110-1 through 110-n that are connected to application server 120.

Each client device 160 includes a client application 162. Client application 162 is used to provide a user interface to application publishing service 122 of application server 120. Namely, client application 162 is the component that is the counterpart to application publishing service 122 of application server 120. Client application 162 may be implemented as a web application and run in a web browser, such as Internet Explorer. However, client application 162 may be implemented by other means, such as a .NET application, a light weight desktop application, a mobile app, and the like.

Application publishing service 122 of application server 120 is the first process that client application 162 of client devices 160 connects to. The purpose of application publishing service 122 is to authenticate users 150 and keep track of what each individual user 150 is allowed to access. Namely, application publishing service 122 is used to enforce the access rights and limitations that a system administrator (not shown) has defined.

Optionally, client-server computing system 100 may support a document sharing service, such as any cloud-based service. Accordingly, document database 130 provides a centralize document storage means in hosting service 105. In one example, document database 130 is used for storing a repository of documents 132. In this example, documents 132 may be any documents created and/or processed using applications 112. Using client devices 160, documents 132 may be created by users 150, then saved to document database 130 and shared with other users 150.

User/group information 142 may be stored in user database 140. A system administrator (not shown) creates and defines user/group information 142. Additionally, if allowed by the administrator, users may create their own accounts and groups. User/group information 142 may contain, for example, account information, user names, group names, user/group credentials, locations of user/group profiles (e.g., file paths), and the like.

Client-server computing system 100, and more particularly hosting service 105, may support a cloud computing environment. In a cloud computing environment, application server 120 is the cloud server. Further, hosting service 105 of client-server computing system 100 is not limited to one application server 120 only. Hosting service 105 may include any number of application servers 120 (or cloud servers).

Some of applications 112 of host computers 110 are designed having control application programming interfaces (APIs) that are published, which allows control commands to be translated directly between the client devices 160 and the remote applications 112. The Microsoft® Office suite of programs is an example of applications 112 whose control APIs are published. In this example, the Windows framework provides programmatic ways of processing MS Office user I/O commands. However, there are many other types of applications 112 of host computers 110 that do not have published control APIs and therefore there can be no direct access to the functionality thereof using client devices 160. Namely, the control functions only exist internal to these applications 112 and without programmatic accessibility by other programs or processes.

Therefore, application server 120 further includes a translation framework 124 that provides a set of generic public APIs 126 by which client devices 160 may control the remote applications 112 that natively do not provide published APIs. Translation framework 124 may be implemented as a software development kit (SDK) framework. Further, translation framework 124 is implemented as a library function. The presence of translation framework 124 in client-server computing system 100 removes the burden of application providers (or software vendors) providing their own external-facing control APIs. Instead, translation framework 124 provides public APIs 126, which are the external-facing control APIs. Public APIs 126 may include generic public APIs, such as, but not limited to, a file new API, a file open API, a file close API, a file save API, a file delete API, a zoom in API, a zoom out API, a scroll up API, a scroll down API, and the like.

Application providers use translation framework 124 to create a translation layer 118 that is specific to each type of application 112. Translation layer 118 is an abstraction layer that may be used, in one example, to abstract from the Window Mobile OS to a certain application 112. More particularly, translation layer 118 is used to map the public APIs 126 of translation framework 124 to the internal control functions of the certain application 112.

In one example, if the application 112 that does not have public APIs is Quicken®, translation framework 124 is used to create a Quicken-specific translation layer 118 that is integrated into the Quicken® application 112. The Quicken-specific translation layer 118 maps the public APIs 126 of translation framework 124 to the internal control functions of Quicken®. For example, when a user 150 accesses the remote Quicken® application via his/her client device 160 and finger-taps on the "new document" control button, a "file new" call is transmitted to the Quicken-specific translation layer 118 of the Quicken® application 112 at host computer 110. The Quicken-specific translation layer 118 translates the "file new" call to the internal "new file dialog" of the Quicken® application 112. The Quicken® application 112 performs the requested action and the result of the action is "remoted" to the client device 160 and its display is updated accordingly.

In summary, translation framework 124 is used to correlate the native I/O commands of client devices 160 to generic I/O commands that are understood by the translation layers 118. Translation layers 118 interpret the generic I/O commands and then translate the generic I/O commands into the native source code of applications 112. The applications 112 then execute the commands initiated by users 150 on client devices 160.

Figure 2:
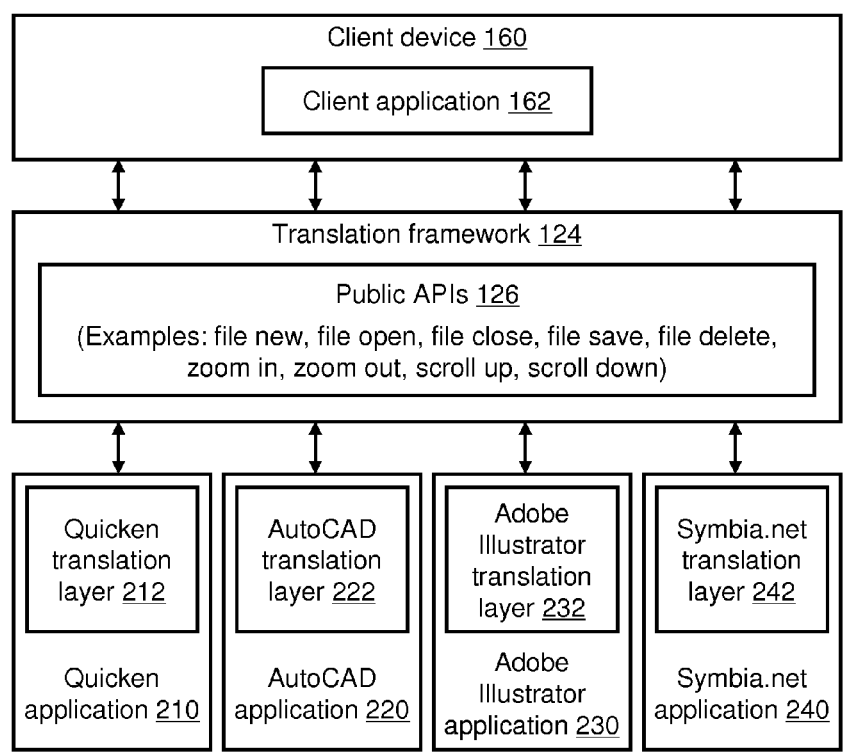
FIG. 2 illustrates a block diagram of an example of a framework architecture that supports a universal I/O command translation framework.
Figure 3:
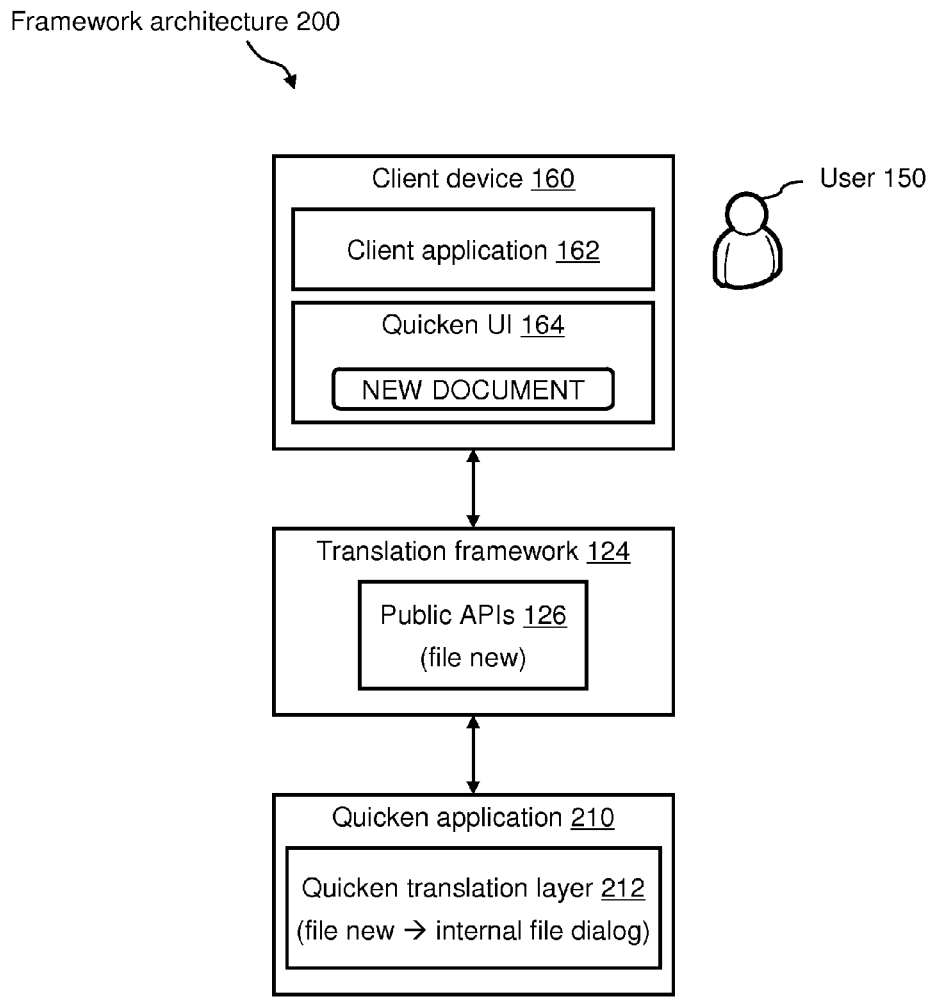
FIG. 3 illustrates a block diagram of another example of the framework architecture that shows an example of a specific command translation.

FIGS. 2 and 3 show more details of the framework architecture. FIG. 2 illustrates a block diagram of an example of a framework architecture 200 that supports a universal I/O command translation framework. In this example, framework architecture 200 includes a client device 160 that is in communication with multiple types of remote applications 112 through the public APIs 126 of translation framework 124. For example, client device 160 is in communication with a Quicken® application 210, an AutoCAD® application 220, an Adobe Illustrator® application 230, and a Symbia.net™ application 240. For the purpose of illustration, Quicken® application 210, AutoCAD® application 220, Adobe Illustrator® application 230, and Symbia.net™ application 240 are examples of applications 112 whose control functions are typically private. However, in client-server computing system 100, and in particular using framework architecture 200, an abstraction layer is added to these applications 112 to enable access to their internal control functions. For example, a Quicken® translation layer 212 is integrated into the Quicken® application 210, an AutoCAD® translation layer 222 is integrated into the AutoCAD® application 220, an Adobe Illustrator® translation layer 232 is integrated into the Adobe Illustrator® application 230, and a Symbia.net™ translation layer 242 is integrated into the Symbia.net™ application 240. Application developers (software vendors) use translation framework 124 to create the Quicken® translation layer 212, the AutoCAD® translation layer 222, the Adobe Illustrator® translation layer 232, and the Symbia Symbia.net™ translation layer 242. Quicken® translation layer 212, AutoCAD® translation layer 222, Adobe Illustrator® translation layer 232, and Symbia Symbia.net™ translation layer 242 are examples of translation layers 118 shown in FIG. 1.

In this example, the Quicken® translation layer 212 translates the generic public APIs 126 that translation framework 124 provides to internal control functions of the Quicken® application 210. Similarly, the AutoCAD® translation layer 222 translates the generic public APIs 126 to internal control functions of the AutoCAD® application 220, the Adobe Illustrator® translation layer 232 translates the generic public APIs 126 to internal control functions of the Adobe Illustrator® application 230, and the Symbia.net™ translation layer 242 translates the generic public APIs 126 to internal control functions of the Symbia.net™ application 240. A detailed example of the translation is described with reference to FIG. 3.

FIG. 3 illustrates a block diagram of another example of framework architecture 200 that shows an example of a specific command translation. In FIG. 3, the user 150 accesses the remote Quicken® application 210. In doing so, a Quicken® user interface (UI) 164 is "remoted" to client device 160 and presented to user 150. Among other controls that are not shown, Quicken® UI 164 includes a NEW DOCUMENT pushbutton. When user 150 finger-taps the NEW DOCUMENT pushbutton, a NEW DOCUMENT command is created at client device 160. The NEW DOCUMENT command is transmitted from client device 160 to application server 120 and is intercepted by translation framework 124. Translation framework 124 correlates the NEW DOCUMENT command from client device 160 to, for example, the "file new" public API 126. The Quicken® translation layer 212 detects the "file new" public API 126 and uses an action wizard to translate the "new file" public API 126 to the Quicken® internal "new file dialog."

Figure 4:
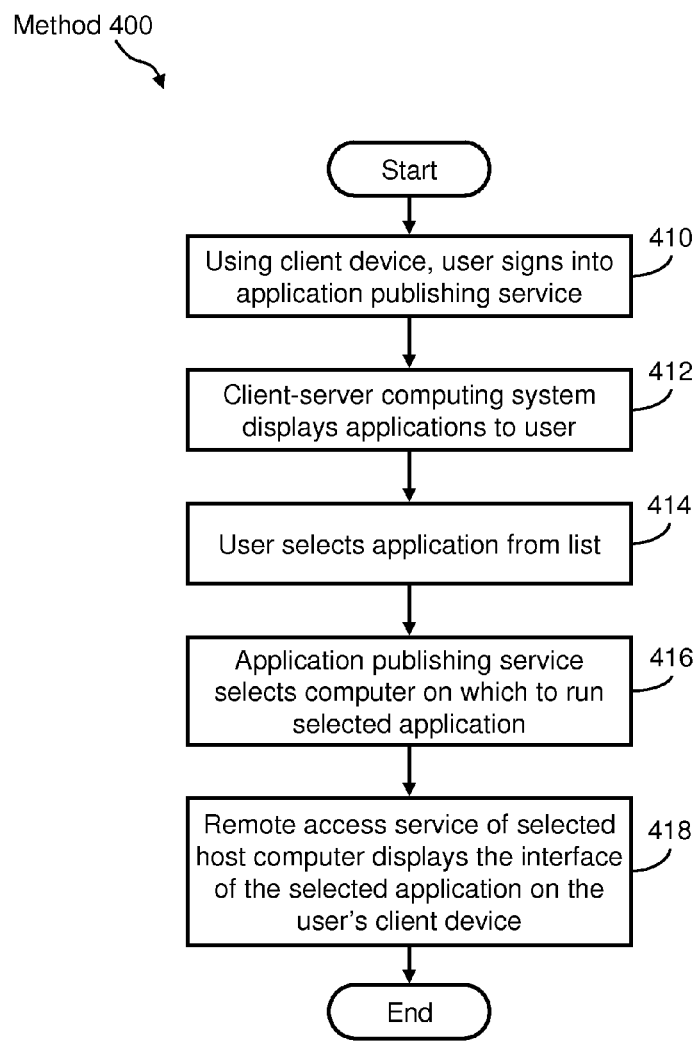
FIG. 4 illustrates a flow diagram of specific examples of a method of a user accessing multiple applications that are available through the application publishing service of the client-server computing system.

FIG. 4 illustrates an example of a flow diagram of a method 400 of a user 150 accessing an application 112 that is available through application publishing service 122 of client-server computing system 100. Method 400 may include, but is not limited to, the following steps.

At a step 410, using client application 162 of the user's client device 160, the user 150 signs into the application publishing service 122 and a standard authentication process is performed that allows the user 150 to access applications 112 of host computers 110-1 through 110-n and document database 130. User-sign in may occur a number of ways. In one example, the user 150 may manually browse to the website of application publishing service 122 and enter credentials (e.g., username and password). In another example, the user sign-in process may occur automatically when the user 150 starts his/her client device 160.

At a step 412, client-server computing system 100 displays the applications 112 that are available to the authenticated user 150. More specifically, a list of applications 112 to which the user 150 has rights and privileges is published by application publishing service 122 and displayed on the user's client device 160.

At a step 414, user 150 selects a certain application 112 from the list presented in step 412. In one example, if the user 150 selects a Microsoft® PowerPoint application, which is one of the listed applications 112.

At a step 416, application publishing service 122 selects the host computer 110 on which to start the application 112 selected in step 414. The choice of computers includes any host computers 110-1 through 110-n of hosting service 105 to which the user 150 has access rights. For example, application publishing service 122 selects a host computer 110 that has the lightest load (i.e., lowest CPU utilization) or selects the last host computer 110 that the user 150 accessed in a previous session on hosting service 105. In one example, application publishing service 122 selects host computer 110-2 for running the Microsoft® PowerPoint application on behalf of the user's client device 160.

At a step 418, remote access service 114 of the host computer 110 selected in step 416 displays the interface of the application 112 selected in step 414 on the user's client device 160 via client application 162. Continuing the example, remote access service 114 of host computer 110-2 displays the interface of the Microsoft® PowerPoint application on the user's client device 160 via client application 162.

Various embodiments of the present disclosure allow for the method 400 to be performed by an intermediary device, such as a server 180, which may reside, be associated with host computers 110, or reside elsewhere in the network (e.g., the cloud). In one example, server 180 (which may be in intermediary or proxy device) may receive information regarding what the host computer 110-2 is currently displaying. The server 180 may provide information to a certain client device 160 so that the particular client device 160 can generation a corresponding display. Server 180 may additionally monitor the host computer 110-2 to detect any changes, identify any commands, encode the identified commands, generate a bitstream including the encoded commands, and provide a bitstream to the client device 160 for processing. Further, server 180 may include translation framework 124, which is used to integrate the application-specific translation layers 118 into the different types of applications 112.

Referring now to FIGS. 1 and 4, when a user 150 wishes to exit hosting service 105 of client-server computing system 100, the user 150 signs out of application publishing service 122 of application server 120. For example, using client application 162, which may be launched in a web browser on his/her client device 160, the user 150 selects certain logout controls (e.g., clicks on a logout button). In so doing, the connection to application server 120 of hosting service 105 is closed. The user 150 may then close the web browser on his/her client device 160. Alternatively, the user's session times out and the connection to application server 120 of hosting service 105 is automatically closed.

Once the user 150 signs out of application publishing service 122 or the user's session times out, application publishing service 122 of application server 120 may delete the user 150's host sessions on all host computers 110. Alternatively, the user 150's host sessions may remain running so that the user 150 can reconnect to them at a later time.

Figure 5:
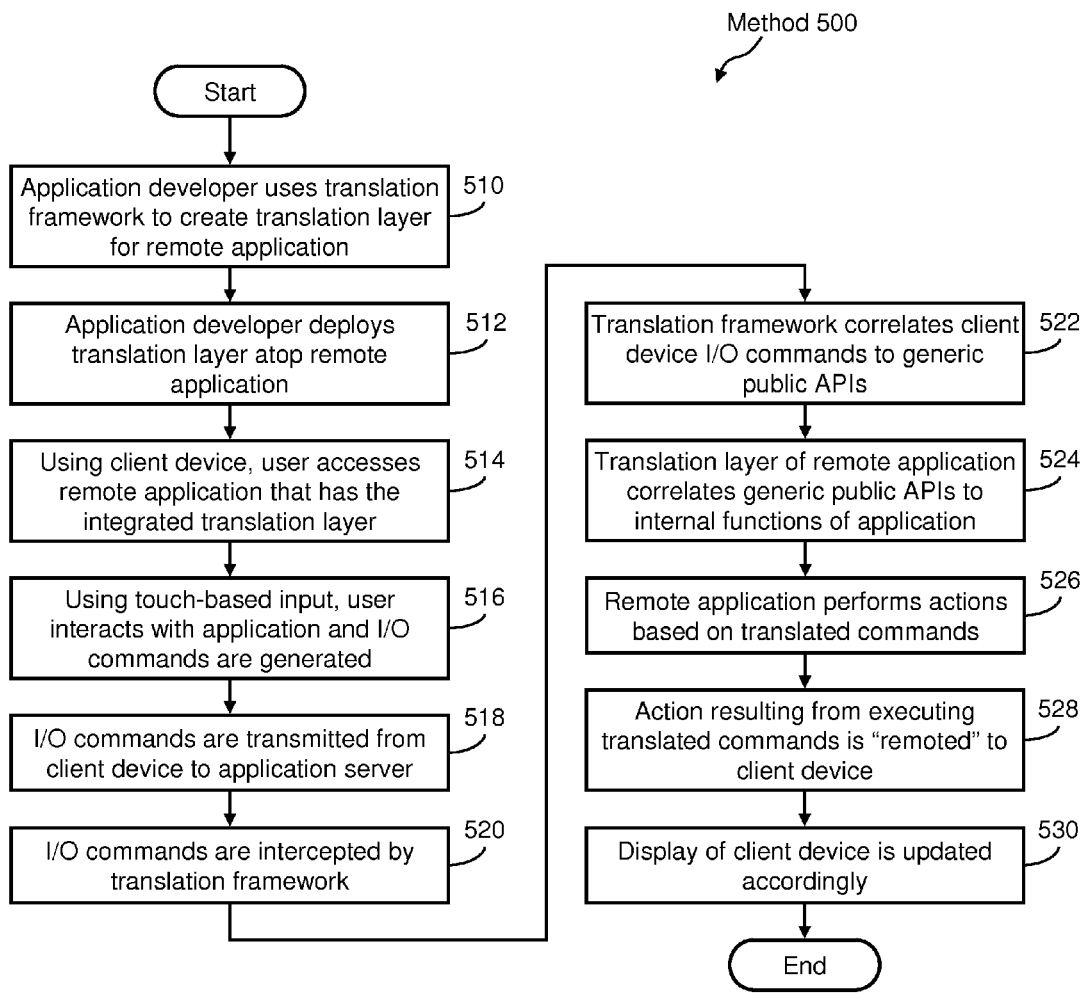
FIG. 5 illustrates a flow diagram of an example of a method of using the translation framework to translate touch-based user input between a client device and a remote access application in an application publishing environment.

FIG. 5 illustrates a flow diagram of an example of a method 500 of using translation framework 124 to translate touch-based user input between a client device and a remote access application in an application publishing environment. Method 500 may include, but is not limited to, the following steps.

At a step 510, an application developer (or software vendor) uses translation framework 124 to create the translation layer 118 for a certain remote application 112. For example and referring to FIG. 2, application developers use translation framework 124 to create Quicken® translation layer 212, AutoCAD® translation layer 222, Adobe Illustrator® translation layer 232, and Symbia Symbia.net™ translation layer 242, which are examples of translation layers 118 shown in FIG. 1.

At a step 512, the application developer (or software vendor) deploys the translation layer 118 atop the remote application 112. For example and referring again to FIG. 2, the application developer deploys the Quicken® translation layer 212 atop the Quicken® application 210, the application developer deploys the AutoCAD® translation layer 222 atop the AutoCAD® application 220, the application developer deploys the Adobe Illustrator® translation layer 232 atop the Adobe Illustrator® application 230, and the application developer deploys the Symbia.net™ translation layer 242 atop the Symbia.net™ application 240.

At a step 514, using client device 160, the user 150 accesses a certain remote application 112 that has the integrated translation layer 118. In one example and referring to FIG. 3, the user 150 accesses the remote Quicken® application 210 via his/her client device 160.

At a step 516, using touch-based input at client device 160, user 150 interacts with the application 112 and I/O commands are generated. In one example and referring again to FIG. 3, user 150 finger-taps the NEW DOCUMENT pushbutton of the Quicken UI 164 and a NEW DOCUMENT command is created at client device 160.

At a step 518, I/O commands are transmitted from client device 160 to application server 120 of hosting service 105. Continuing the example and referring again to FIG. 3, the NEW DOCUMENT command is transmitted via network 170 from client device 160 to application server 120.

At a step 520, the I/O commands from client device 160 are intercepted by translation framework 124. Continuing the example and referring again to FIG. 3, the NEW DOCUMENT command from client device 160 is intercepted by translation framework 124.

At a step 522, translation framework 124 correlates the I/O commands from client device 160 to generic public APIs 126. Continuing the example and referring again to FIG. 3, translation framework 124 correlates the NEW DOCUMENT command from client device 160 to, for example, the "file new" public API 126.

At a step 524, translation layer 118 of the remote application 112 correlates the generic public APIs 126 to internal functions of the remote application 112. Continuing the example and referring again to FIG. 3, the Quicken® translation layer 212 detects the "file new" public API 126.

At a step 526, the remote application 112 performs actions based on the translated commands of translation layer 118. Continuing the example and referring again to FIG. 3, the Quicken® translation layer 212 uses an action wizard to translate the "new file" public API 126 to the Quicken® internal "new file dialog."

At a step 528, the action resulting from executing the translated commands is "remoted" to client device 160. Continuing the example and referring again to FIG. 3, the action resulting from executing the Quicken® internal "new file dialog" is "remoted" to client device 160.

At a step 530, the display of client device 160 is updated according to the translated commands. Continuing the example and referring again to FIG. 3, a new Quicken® document is displayed to user 150 at client device 160.

Figure 6:
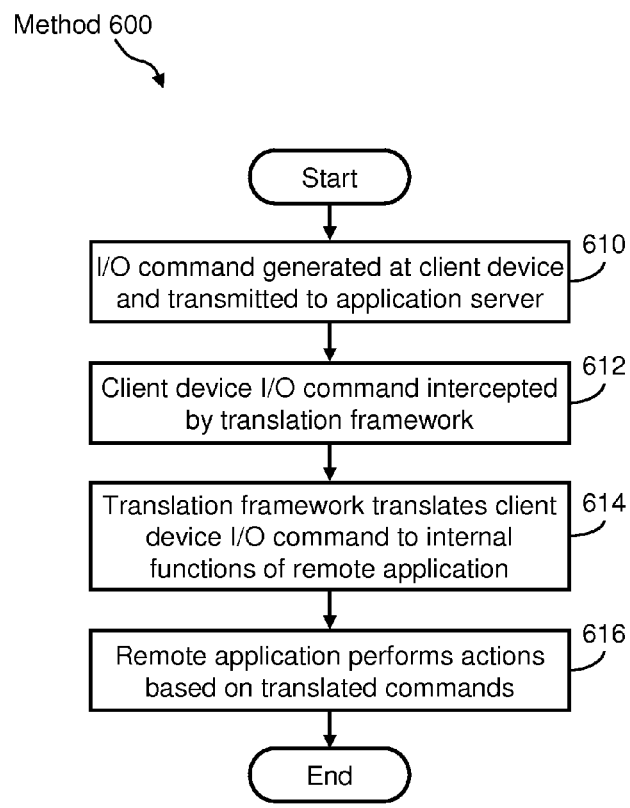
FIG. 6 illustrates a flow diagram of an example of a method of using the translation framework to translate touch-based user input between a client device and a remote access application in an application publishing environment according to a minimum configuration of the present disclosure.

FIG. 6 illustrates a flow diagram of an example of a method 600 of using translation framework 124 to translate touch-based user input between a client device and a remote access application in an application publishing environment according to a minimum configuration of the present disclosure. Method 600 may include, but is not limited to, the following steps.

At a step 610, the I/O command generated at client device 160 and transmitted to application server 120 of hosting service 105. For example and referring to FIG. 3, using the Quicken UI 164, the NEW DOCUMENT command is generated at client device 160 and transmitted via network 170 from client device 160 to application server 120.

At a step 612, the I/O command generated at client device 160 is intercepted by translation framework 124. Continuing the example and referring again to FIG. 3, the NEW DOCUMENT command is intercepted by translation framework 124.

At a step 614, translation framework 124 translates the I/O command generated at client device 160 to internal functions of the remote application 112. Continuing the example and referring again to FIG. 3, translation framework 124 correlates the NEW DOCUMENT command from client device 160 to, for example, the "file new" public API 126. The Quicken® translation layer 212 detects the "file new" public API 126 and then uses an action wizard to translate the "new file" public API 126 to the Quicken® internal "new file dialog."

At a step 616, the remote application 112 performs actions based on the translated commands. Continuing the example and referring again to FIG. 3, the Quicken® application 210 executes its internal "new file dialog" and a new Quicken® document is created and displayed to user 150 at client device 160.

The present disclosure may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the disclosure to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the disclosure as defined by the appended claims and otherwise appreciated by one of ordinary skill in the art. The scope of the disclosure should, therefore, be determined not with reference to the above description, but instead should be determined with reference to the appended claims along with their full scope of equivalents.

What is claimed is:

1. A method of providing a universal input/output (I/O) command translation framework in a cloud-based application publishing environment, the method comprising:

publishing an application by an application server to a client device;

intercepting an I/O command from the client device, by a translation framework operable on a separate physical machine from the application server, wherein the I/O command is generated from a touch-based user input from a touchscreen on the client device, and wherein the translation framework includes a set of generic public APIs;

creating a translation layer using one or more of the generic public APIs, the translation layer being specific to the application;

translating, by the translation framework, the received I/O command into a function corresponding to an internal function native to the application being published, wherein the function maps APIs corresponding to the I/O commands from the client device to the corresponding generic public APIs corresponding to internal functions native to the application used, and wherein the function native to the application being published is a mouse control function or a keyboard control function;

presenting the translated commands to the published application, wherein the translated commands from the client correspond to the mapped generic public API of the translation layer; and performing, by the published application, actions based on the translated commands, the translated commands facilitating the operation of the published application.

2. The method of claim 1, further comprising communicating a user interface of the application to the client device.

3. The method of claim 2, wherein the user interface of the application is displayed on the client device.

4. The method of claim 1, wherein each generic public API is associated with different applications resident on the host computer.

5. A non-transitory computer readable storage medium having embodied thereon a program executable by a processor to perform a method of providing a universal input/output (I/O) command translation framework in a cloud-based publishing environment, the method comprising:

publishing an application by an application server to a client device;

intercepting an I/O command from the client device, by a translation framework operable on a separate physical machine from the application server, wherein the I/O command is generated from a touch-based user input from a touchscreen on the client device, and wherein the translation framework includes a set of generic public APIs;

creating a translation layer using one or more of the generic public APIs, the translation layer being specific to the application;

translating, by the translation framework, the received I/O command into a function corresponding to an internal function native to the application being published, wherein the function maps APIs corresponding to the I/O commands from the client device to the corresponding generic public APIs corresponding to internal functions native to the application, and wherein the function native to the application being published is a mouse control function or a keyboard control function;

presenting the translated commands to the published application, wherein the translated commands from the client correspond to the mapped generic public API of the translation layer; and performing, by the published application, actions based on translated commands, the translated commands facilitating the operation of the published application.

6. The non-transitory computer readable storage medium of claim 5, further comprising instructions executable to communicate a user interface of the application to the client device.

7. The non-transitory computer readable storage medium of claim 5, wherein each generic public API is associated with different applications resident on the host computer.

8. A system for providing a universal input/output command translation framework in a cloud-based application publishing environment, the system comprising:

a memory for storing a translation framework;

a communication interface for receiving an I/O command from a client device over a data communication network; and a processor for executing instructions stored in memory, wherein execution of the instructions by the processor:

publishes an application to the client device, intercepts the I/O command from the client device by a translation framework operable on a separate machine from the application server regarding the published application, wherein the I/O command is generated from a touch-based user input from a touchscreen on the client device, and wherein the translation framework includes a set of generic public APIs;

creating a translation layer using one or more of the generic public APIs, the translation layer being specific to the application;

translates the intercepted I/O command into a function native to the application being published based on the translation framework stored in memory, wherein the function maps APIs corresponding to the I/O commands from the client device to the corresponding generic public APIs corresponding to internal functions native to the application, and wherein the function native to the application being published is a mouse control function or a keyboard control function; and presents the translated commands to the published application for execution, wherein the translated commands from the client correspond to the mapped generic public API of the translation layer and are used for facilitating the operation of the published application.

9. The system of claim 8, wherein the communication interface communicates a user interface of the application to the client device over the data communication network.

10. The system of claim 9, wherein the communication interface transmits the user interface of the application to the client device.

11. The system of claim 8, wherein each generic public API is associated with different applications resident on the host computer.

* * * * *